(12) United States Patent
Izuchukwu et al.

(10) Patent No.: US 6,502,571 B1
(45) Date of Patent: *Jan. 7, 2003

(54) HIGH PRESSURE FITTING WITH DUAL LOCKING SWAGING MECHANISM

(75) Inventors: John I. Izuchukwu, Wildwood, MO (US); Stan A. Sanders, Chesterfield, MO (US)

(73) Assignee: Mallinckrodt Inc., St. Louis, MO (US)

( * ) Notice: Subject to any disclaimer, the term of this patent is extended or adjusted under 35 U.S.C. 154(b) by 52 days.

This patent is subject to a terminal disclaimer.

(21) Appl. No.: 09/592,900

(22) Filed: Jun. 13, 2000

(51) Int. Cl.[7] .............................................. A61M 15/00
(52) U.S. Cl. .............................. 128/202.19; 128/205.22
(58) Field of Search ................................. 285/256, 245, 285/239, 238, 216, 196, 138; 137/68.19, 68.23, 71; 128/202.11, 202.18, 202.19, 205.13, 205.22

(56) References Cited

U.S. PATENT DOCUMENTS

| | | | |
|---|---|---|---|
| 601,591 A | * 3/1898 | Sherman | 285/256 |
| 724,129 A | 3/1903 | Schrader | |
| 771,801 A | 10/1904 | Andrew | |
| 1,288,857 A | 12/1918 | Farr | 128/205.22 |
| 1,348,708 A | 8/1920 | Garland | |
| 1,410,405 A | 3/1922 | Johnson | |
| 1,588,606 A | 6/1926 | Oden | |
| 1,745,785 A | 2/1930 | Deming | |
| 1,778,244 A | 10/1930 | Cadden | |
| 1,786,489 A | * 12/1930 | Hopkins | 285/256 |
| 1,901,088 A | 3/1933 | Dick | |
| 2,319,024 A | 5/1943 | Wehringer | |
| 2,376,353 A | 5/1945 | Grant, Jr. et al. | |
| 2,380,372 A | 7/1945 | Alderfer | 244/148 |
| 2,430,921 A | 11/1947 | Edelmann | |
| 2,524,052 A | 10/1950 | Grant, Jr. | |
| 2,531,700 A | 11/1950 | Porter | |
| 2,540,113 A | 2/1951 | Hartley et al. | |
| 2,764,430 A | * 9/1956 | Roberts | 285/245 |
| 2,771,069 A | 11/1956 | Baron | |
| 2,814,291 A | 11/1957 | Holmes | |
| 2,829,671 A | * 4/1958 | Ernst et al. | 285/245 |
| 2,861,569 A | 11/1958 | Emerson | |
| 3,185,500 A | * 5/1965 | Luther | 285/256 |
| 3,338,238 A | 8/1967 | Warncke | 128/142.2 |
| 3,432,060 A | 3/1969 | Cowley | 220/3 |
| 3,491,752 A | 1/1970 | Cowley | 128/147 |
| 3,729,002 A | 4/1973 | Miller | |
| 4,060,079 A | 11/1977 | Reinhold, Jr. | |
| 4,090,509 A | 5/1978 | Smith | 128/142.5 |
| 4,181,993 A | 1/1980 | McDaniel | 9/329 |
| 4,253,454 A | 3/1981 | Warncke | 128/202.26 |
| 4,584,996 A | 4/1986 | Blum | |
| 4,612,928 A | 9/1986 | Tiep et al. | |
| 4,665,943 A | 5/1987 | Medvick et al. | 137/543.17 |
| 4,736,969 A | * 4/1988 | Fouts | 285/245 |
| 4,739,913 A | 4/1988 | Moore | |

(List continued on next page.)

FOREIGN PATENT DOCUMENTS

| | | |
|---|---|---|
| DE | 971689 | 3/1959 |
| DE | 2644806 | 4/1978 |
| FR | 1037477 | 9/1953 |
| WO | WO 97/11734 | 4/1997 |

Primary Examiner—Aaron J. Lewis
(74) Attorney, Agent, or Firm—Rothwell, Figg, Ernst & Manbeck

(57) ABSTRACT

A fitting with a dual locking swaging mechanism includes a projection to be inserted into the open end of an elastomeric tube. A ferrule is connected at one end thereof to a body portion of the fitting and is swaged over the tube to hold the tube onto the projection inserted into the tube. The tube is thereby held to the fitting by both frictional engagement of the tube with the projection and the ferrule and by the connection of the ferrule with the main body of the fitting.

1 Claim, 9 Drawing Sheets

U.S. PATENT DOCUMENTS

| | | |
|---|---|---|
| 4,744,356 A | 5/1988 | Greenwood |
| 4,800,923 A | 1/1989 | Bartos ........................ 137/613 |
| 4,932,403 A | 6/1990 | Scholley ................ 128/205.22 |
| 4,964,404 A | 10/1990 | Stone |
| 4,964,405 A | 10/1990 | Arnoth |
| 4,989,599 A | 2/1991 | Carter |
| 4,991,876 A | 2/1991 | Mulvey |
| 5,036,845 A | 8/1991 | Scholley ................ 128/205.22 |
| 5,099,836 A | 3/1992 | Rowland et al. |
| 5,127,399 A | 7/1992 | Scholley ................ 128/205.22 |
| 5,323,953 A | 6/1994 | Adderley et al. ........... 228/157 |
| 5,370,113 A | 12/1994 | Parsons |
| 5,400,934 A | 3/1995 | Ducros |
| 5,435,305 A | 7/1995 | Rankin, Sr. ............ 128/205.22 |
| 5,494,469 A | 2/1996 | Heath et al. ................. 441/118 |
| 5,503,143 A | 4/1996 | Marion et al. |
| 5,517,984 A | 5/1996 | Sanders ................. 128/205.22 |
| 5,529,061 A | 6/1996 | Sanders ................. 128/205.22 |
| 5,529,096 A | 6/1996 | Rowe, Jr. et al. |
| 5,582,164 A | 12/1996 | Sanders ................. 128/205.22 |
| 5,632,268 A | 5/1997 | Ellis et al. |
| 5,830,400 A | 11/1998 | Huvey et al. ................. 264/254 |
| 5,839,383 A | 11/1998 | Stenning et al. ............... 114/72 |
| 5,975,081 A | 11/1999 | Hood et al. |
| 6,003,460 A | 12/1999 | Stenning et al. ............... 114/72 |
| 6,047,860 A | 4/2000 | Sanders ......................... 222/3 |
| 6,187,182 B1 | 2/2001 | Reynolds et al. |
| 6,230,737 B1 | 5/2001 | Notaro et al. |
| 6,240,951 B1 | 6/2001 | Yori |

\* cited by examiner

HIGH PRESSURE FITTING WITH DUAL LOCKING SWAGING MECHANISM

FIELD OF THE INVENTION

The present invention is directed to a fitting having a dual locking swaging mechanism for securely attaching the fitting to an elastomeric tube subjected to high internal pressure.

BACKGROUND OF THE INVENTION

There are many applications for a portable supply of fluid under pressure. For example, SCUBA divers and firefighters use portable, pressurized oxygen supplies. Commercial aircraft employ emergency oxygen delivery systems that are used during sudden and unexpected cabin depressurization. Military aircraft typically require supplemental oxygen supply systems as well. Such systems are supplied by portable pressurized canisters. In the medical field, gas delivery systems are provided to administer medicinal gas, such as oxygen, to a patient undergoing respiratory therapy. Supplemental oxygen delivery systems are used by patients that benefit from receiving and breathing oxygen from an oxygen supply source to supplement atmospheric oxygen breathed by the patient. For such uses, a compact, portable supplemental oxygen delivery system is useful in a wide variety of contexts, including hospital, home care, and ambulatory settings.

High-pressure supplemental oxygen delivery systems typically include a cylinder or tank containing oxygen gas at a pressure of up to 3,000 psi. A pressure regulator is used in a high-pressure oxygen delivery system to "step down" the pressure of oxygen gas to a lower pressure (e.g., 20 to 50 psi) suitable for use in an oxygen delivery apparatus used by a person breathing the supplemental oxygen.

In supplemental oxygen delivery systems, and in other applications employing portable supplies of pressurized gas, containers used for the storage and use of compressed fluids, and particularly gases, generally take the form of cylindrical metal bottles that may be wound with reinforcing materials to withstand high fluid pressures. Such storage containers are expensive to manufacture, inherently heavy, bulky, inflexible, and prone to violent and explosive fragmentation upon rupture.

Container systems made from lightweight synthetic materials have been proposed. Scholley, in U.S. Pat. Nos. 4,932, 403; 5,036,845; and 5,127,399, describes a flexible and portable container for compressed gases which comprises a series of elongated, substantially cylindrical chambers arranged in a parallel configuration and interconnected by narrow, bent conduits and attached to the back of a vest that can be worn by a person. The container includes a liner, which may be formed of a synthetic material such as nylon, polyethylene, polypropylene, polyurethane, tetrafluoroethylene, or polyester. The liner is covered with a high-strength reinforcing fiber, such as a high-strength braid or winding of a reinforcing material such as Kevlar® aramid fiber, and a protective coating of a material, such as polyurethane, covers the reinforcing fiber. The design described in the Scholley patents suffers a number of shortcomings which makes it impractical for use as a container for fluids stored at the pressure levels typically seen in portable fluid delivery systems such as SCUBA gear, firefighter's oxygen systems, emergency oxygen systems, and medicinal oxygen systems. The elongated, generally cylindrical shape of the separate storage chambers does not provide an effective structure for containing highly-pressurized fluids. Moreover, the relatively large volume of the storage sections creates an unsafe system subject to possible violent rupture due to the kinetic energy of the relatively large volume of pressurized fluid stored in each chamber.

Furthermore, attaching mechanical components, such as components made from metal, including valves and gages, to polymeric or elastomeric hoses or pressure vessels can be problematic. Typically, a metal, threaded fitting is attached to the hose or pressure vessel, and gages and/or valves can be threaded onto and off of the fitting. The fitting may include a barbed projection that is inserted into the hose or pressure vessel, and a ferrule is crimped, or swaged, over the hose or pressure vessel to press the elastic material into locking engagement with the barbed projection. In such an arrangement, the hose is secured to the fitting by only the frictional engagement of the interior surface of the hose with the barbed projection. Due to the high pressure to which the fitting is exposed, however, the fitting and hose can become separated if there is slippage between the barbed projection and the interior surface of the hose.

Crimping ferrules have been formed integrally with the fitting, coaxially with the barbed projection, so as to provide a secondary mechanism by which the hose is held to the fitting, namely the frictional engagement of the interior of the crimped ferrule, which is attached to the fitting, and the exterior surface of the hose. Such integrated fitting and ferrule arrangements have been shown to provide satisfactory securement between the fitting and an elastomeric hose, but forming a ferrule that is integral with the fitting and coaxial with a barbed projection of the fitting is expensive.

Accordingly, there is a need for an inexpensive mechanical fitting that can be attached to a elastomeric hose or pressure vessel in such a manner that the fitting will not become separated from the elastomeric material, even when subjected to high internal pressures within the hose or vessel.

SUMMARY OF THE INVENTION

According to one aspect of the invention, container system for pressurized fluids comprises a pressure vessel including a plurality of hollow polymeric chambers interconnected by polymeric conduit sections positioned between adjacent ones of the plurality of hollow chambers with an end one of the conduit sections extending from an endmost one of the interconnected hollow chambers. Each of the conduit sections having a maximum interior transverse dimension that is smaller than a maximum interior transverse dimension of each of the hollow chambers. A mechanical fitting is connected to the end one of the plurality of conduit sections. The mechanical fitting comprises a body portion with a projection extending therefrom and adapted to be axially inserted into the conduit section. A ferrule is connected at one longitudinal end thereof to the body portion of the fitting and is arranged in an outwardly spaced coaxial relation with respect to the projection. The ferrule has a crimping portion constructed and arranged to be radially swaged onto a portion of the conduit section into which the projection is inserted to thereby compress the portion of the conduit section onto the projection to secure the conduit section onto the projection.

According to another aspect of the invention, a fitting assembly is adapted to be attached to an end of an elastomeric tube and comprises a body portion with a projection extending therefrom. The projection is adapted to be inserted into the end of the elastomeric tube. The body portion also includes a threaded collar adjacent the projection, and a ferrule for securing the elastomeric tube onto the projection includes a threaded opening at one longitudinal end thereof. The threaded opening of the ferrule is threaded onto the threaded collar of the body portion. The ferrule is arranged in an outwardly spaced coaxial relation with respect to the projection and has a crimping portion constructed and arranged to be radially swaged onto a portion of the elastomeric tube into which the projection is inserted to thereby compress the elastomeric tube onto the projection to secure the elastomeric tube onto the projection.

According to another aspect of the invention, a method for attaching a mechanical fitting to an end of an elastomeric tube comprises inserting a projection of a body portion of the mechanical fitting into the end of the tube, arranging a ferrule coaxially over an end of the tube into which the projection is inserted, attaching an end of the ferrule to the body portion of the fitting, and swaging a portion of the ferrule radially inwardly to radially compress the tube onto the projection to secure the tube to the projection.

Other objects, features, and characteristics of the present invention will become apparent upon consideration of the following description and the appended claims with reference to the accompanying drawings, all of which form a part of the specification, and wherein like reference numerals designate corresponding parts in the various figures.

DETAILED DESCRIPTION OF THE INVENTION

With reference to the figures, exemplary embodiments of the invention will now be described. These embodiments illustrate principles of the invention and should not be construed as limiting the scope of the invention.

Figure 1:
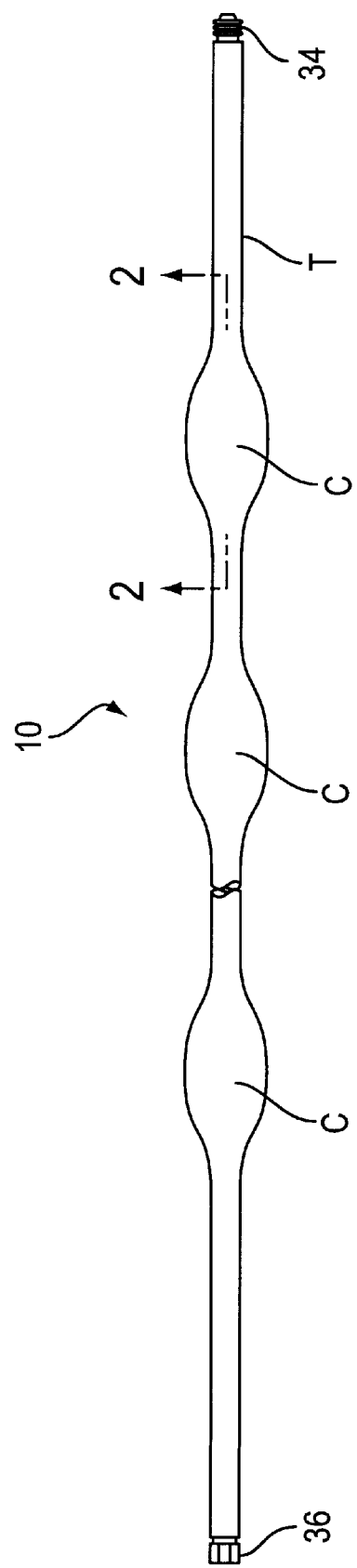
FIG. 1 is a broken side elevational view of a plurality of aligned, rigid, generally ellipsoidal chambers interconnected by a tubular core.
Figure 2:
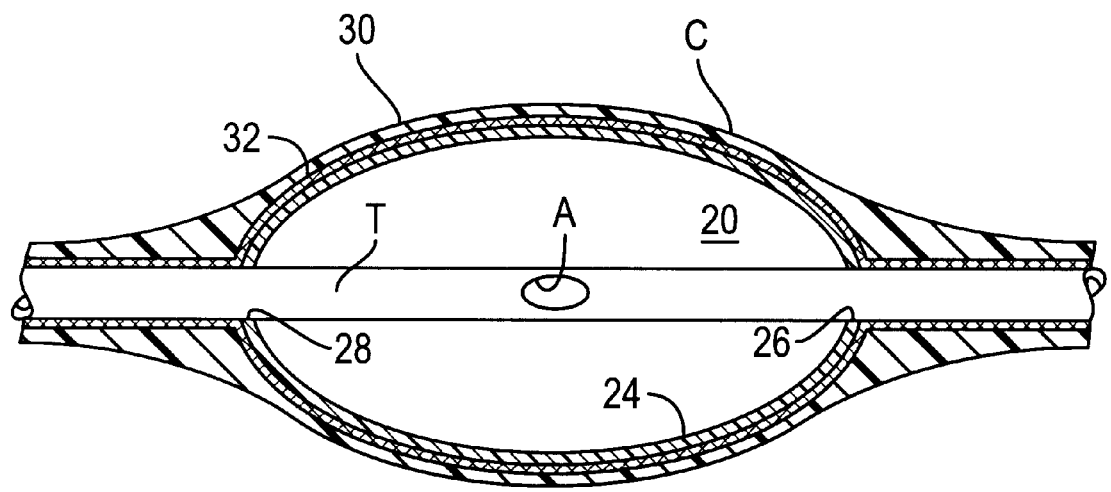
FIG. 2 is an enlarged horizontal sectional view taken along the line 2—2 in FIG. 1.

As shown in FIGS. 1 and 2, U.S. Pat. No. 6,047,860 (the disclosure of which is hereby incorporated by reference) to Sanders, an inventor of the present invention, discloses a container system 10 for pressurized fluids including a plurality of form-retaining, generally ellipsoidal chambers C interconnected by a tubular core T. The tubular core extends through each of the plurality of chambers and is sealingly secured to each chamber. A plurality of longitudinally-spaced apertures A are formed along the length of the tubular core, one such aperture being disposed in the interior space 20 of each of the interconnected chambers so as to permit infusion of fluid to the interior space 20 during filling and effusion of the fluid from the interior space 20 during fluid delivery or transfer to another container. The apertures are sized so as to control the rate of evacuation of pressurized fluid from the chambers. Accordingly, a low fluid evacuation rate can be achieved so as to avoid a large and potentially dangerous burst of kinetic energy should one or more of the chambers be punctured (i.e., penetrated by an outside force) or rupture.

The size of the apertures A will depend upon various parameters, such as the volume and viscosity of fluid being contained, the anticipated pressure range, and the desired flow rate. In general, smaller diameters will be selected for gasses as opposed to liquids. Thus, the aperture size may generally vary from about 0.010 to 0.125 inches. Although only a single aperture A is shown in FIG. 2, more than one aperture A can be formed in the tube T within the interior space 20 of the shell 24. In addition, each aperture A can be formed in only one side of the tube T, or the aperture A may extend through the tube T.

Referring to FIG. 2, each chamber C includes a generally ellipsoidal shell 24 molded of a suitable synthetic plastic material and having open front and rear ends 26 and 28. The diameters of the holes 26 and 28 are dimensioned so as to snugly receive the outside diameter of the tubular core T. The tubular core T is attached to the shells 24 so as to form a fluid tight seal therebetween. The tubular core T is preferably bonded to the shells 24 by means of light, thermal, or ultrasonic energy, including techniques such as, ultrasonic welding, radio frequency energy, vulcanization, or other thermal processes capable of achieving seamless circumferential welding. The shells 24 may be bonded to the tubular core T by suitable ultraviolet light-curable adhesives, such as 3311 and 3341 Light Cure Acrylic Adhesives available from Loctite Corporation, having authorized distributors throughout the world. The exterior of the shells 24 and the increments of tubular core T between such shells are pressure wrapped with suitable pressure resistant reinforcing filaments 30 to resist bursting of the shells and tubular core. A protective synthetic plastic coating 32 is applied to the exterior of the filament wrapped shells and tubular core T.

More particularly, the shells 24 may be either roto molded, blow molded, or injection molded of a synthetic plastic material such as TEFLON or fluorinated ethylene propylene. Preferably, the tubular core T will be formed of the same material. The pressure resistant filaments 30 may be made of a carbon fiber, Kevlar® or Nylon. The protective coating 32 may be made of urethane to protect the chambers and tubular core against abrasions, UV rays, moisture, or thermal elements. The assembly of a plurality of generally ellipsoidal chambers C and their supporting tubular core T can be made in continuous strands of desired length. In the context of the present disclosure, unless stated otherwise, the term "strand" will refer to a discrete length of interconnected chambers.

Figure 2A:
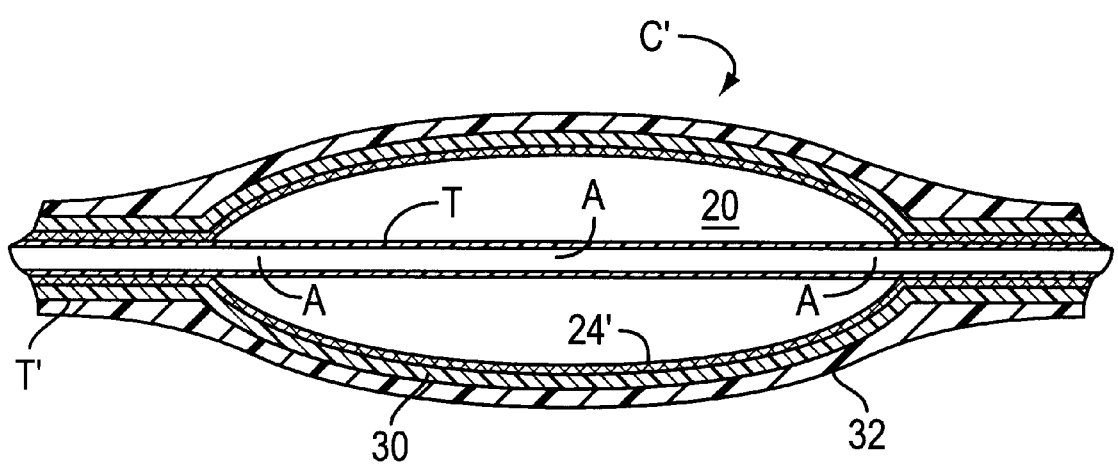
FIG. 2A is an enlarged horizontal sectional view taken along the line 2—2 in FIG. 1 showing an alternate embodiment.

As shown in FIG. 2A, the tube T can be co-formed, such as by co-extrusion, along with shells 24' and tubular portions T' integrally formed with the shells 24' and which directly overlie the tube T between adjacent shells 24'. Furthermore, as also shown in FIG. 2A, more than one aperture A may be formed in the tube T within the interior 20 of the shell 24'. The co-formed assembly comprised of the shells 24', tubular portions T', and tube T can be wrapped with a layer of reinforcing filaments 30 and covered with a protective coating 32 as described above.

The inlet or front end of the tubular core T may be provided with a suitable threaded male fitting 34. The discharge or rear end of a tubular core T may be provided with a threaded female fitting 36. Such male and female fittings provide a pressure-type connection between contiguous strands of assemblies of chambers C interconnected by tubular cores T and provide a mechanism by which other components, such as gauges or valves, can be attached to the interconnected chambers. A suitable mechanism for attaching fittings, such as fittings 34 and 36, is described below.

Figure 3:
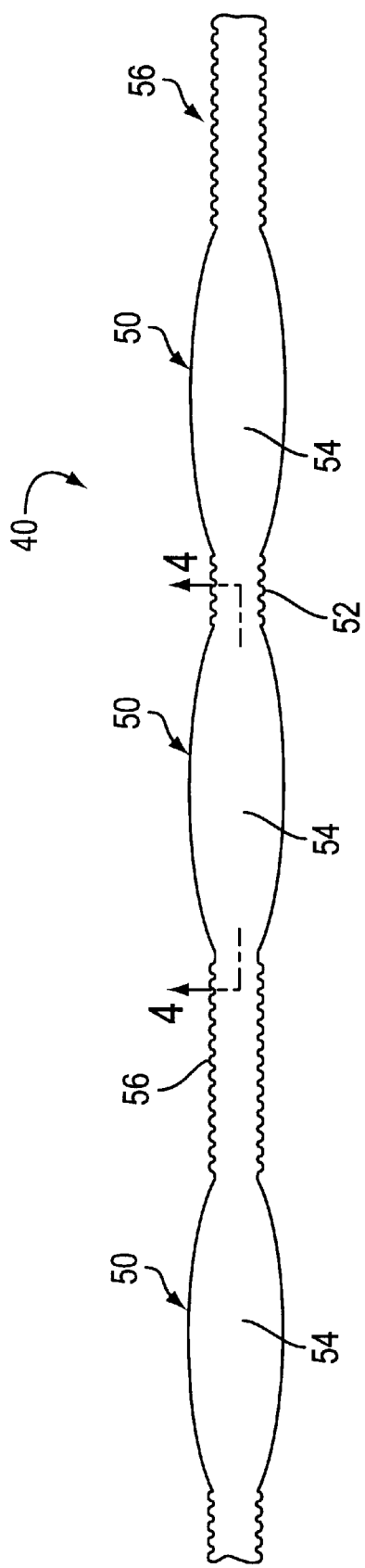
FIG. 3 is a side elevational view of a portion of a container system of the present invention.

A portion of an alternate pressure vessel is designated generally by reference number 40 in FIG. 3. The pressure vessel 40 includes a plurality of fluid storage chambers 50 having a preferred ellipsoidal shape and having hollow interiors 54. The individual chambers 50 are pneumatically interconnected with each other by connecting conduit sections 52 and 56 disposed between adjacent pairs of the chambers 50. Conduit sections 56 are generally longer than the conduit sections 52. The purpose of the differing lengths of the conduit sections 52 and 56 will be described in more detail below.

Figure 4:
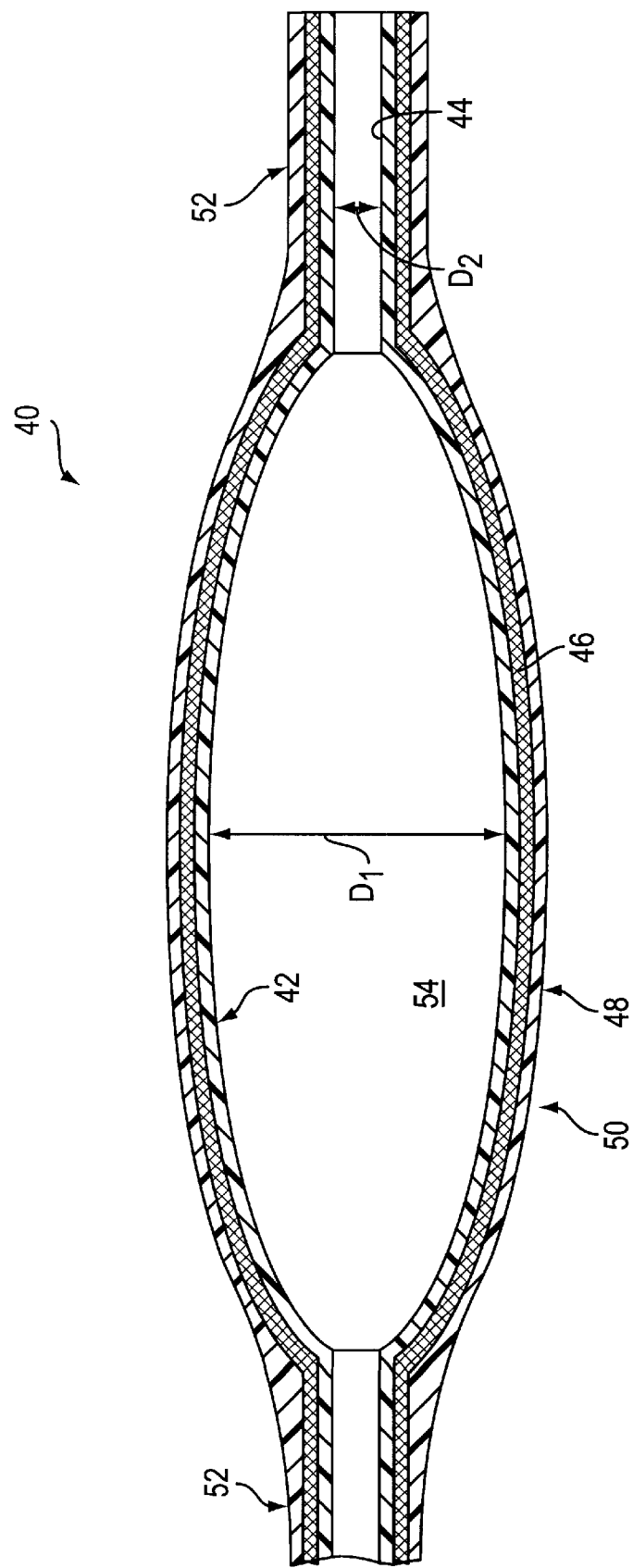
FIG. 4 is a partial longitudinal sectional view along line 4—4 in FIG. 3.

FIG. 4 shows an enlarged longitudinal section of a single hollow chamber 50 and portions of adjacent conduit sections 52 of the pressure vessel 40. The pressure vessel 40 preferably has a layered construction including polymeric hollow shells 42 with polymeric connecting conduits 44 extended from opposed open ends of the shells 42. The polymeric shells 42 and the polymeric connecting conduits 44 are preferably formed from a synthetic plastic material such as Teflon or fluorinated ethylene propylene and may be formed by any of a number of known plastic-forming techniques such as extrusion, roto molding, chain blow molding, or injection molding.

Materials used for forming the shells 42 and connecting conduits 44 are preferably moldable and exhibit high tensile strength and tear resistance. Most preferably, the polymeric hollow shells 42 and the polymeric connecting conduits 44 are formed from a thermoplastic polyurethane elastomer manufactured by Dow Plastics under the name Pellethane® 2363-90AE, a thermoplastic polyurethane elastomer manufactured by the Bayer Corporation, Plastics Division under the name Texin® 5286, a flexible polyester manufactured by Dupont under the name Hytrel®, or polyvinyl chloride from Teknor Apex.

In a preferred configuration, the volume of the hollow interior 54 of each chamber 50 is within a range of capacities configurable for different applications, with a most preferred volume of about thirty (30) milliliters. It is not necessary that each chamber have the same dimensions or have the same capacity. It has been determined that a pressure vessel 40 having a construction as will be described below will undergo a volume expansion of 7–10% when subjected to an internal pressure of 2000 psi. In a preferred configuration, the polymeric shells 42 each have a longitudinal length of about 3.0–3.5 inches, with a most preferred length of 3.250–3.330 inches, and a maximum outside diameter of about 0.800 to 1.200 inches, with a most preferred diameter of 0.095–1.050 inches. The conduits 44 have an inside diameter $D_2$ preferably ranging from 0.125–0.300 inches with a most preferred range of about 0.175–0.250 inches. The hollow shells 42 have a typical wall thickness ranging from 0.03 to 0.05 inches with a most preferred typical thickness of about 0.04 inches. The connecting conduits 44 have a wall thickness ranging from 0.03 to 0.10 inches and preferably have a typical wall thickness of about 0.040 inches, but, due to the differing amounts of expansion experienced in the hollow shells 42 and the conduits 44 during a blow molding forming process, the conduits 44 may actually have a typical wall thickness of about 0.088 inches.

The exterior surface of the polymeric hollow shells 42 and the polymeric connecting conduits 44 is preferably wrapped with a suitable reinforcing filament fiber 46. Filament layer 46 may be either a winding or a braid (preferably a triaxial braid pattern having a nominal braid angle of 75 degrees) and is preferably a high-strength aramid fiber material such as Kevlar® (preferably 1420 denier fibers), carbon fibers, or nylon, with Kevlar® being most preferred. Other potentially suitable filament fiber material may include thin metal wire, glass, polyester, or graphite. The Kevlar winding layer has a preferred thickness of about 0.035 to 0.055 inches, with a thickness of about 0.045 inches being most preferred.

A protective coating 48 may be applied over the layer of filament fiber 46. The protective coating 48 protects the shells 42, conduits 44, and the filament fiber 46 from abrasions, UV rays, thermal elements, or moisture. Protective coating 32 is preferably a sprayed-on synthetic plastic coating. Suitable materials include polyvinyl chloride and polyurethane. The protective coating 32 may be applied to the entire pressure vessel 40, or only to more vulnerable portions thereof. Alternatively, the protective coating 32 could be dispensed with altogether if the pressure vessel 40 is encased in a protective, moisture-impervious housing.

The inside diameter $D_1$ of the hollow shell 42 is preferably much greater than the inside diameter $D_2$ of the conduit section 44, thereby defining a relatively discreet storage chamber within the hollow interior 54 of each polymeric shell 42. This serves as a mechanism for reducing the kinetic energy released upon the rupturing of one of the chambers 50 of the pressure vessel 40. That is, if one of the chambers 50 should rupture, the volume of pressurized fluid within that particular chamber would escape immediately. Pressurized fluid in the remaining chambers would also move toward the rupture, but the kinetic energy of the escape of the fluid in the remaining chambers would be regulated by the relatively narrow conduit sections 44 through which the fluid must flow on its way to the ruptured chamber. Accordingly, immediate release of the entire content of the pressure vessel is avoided.

Figure 5:
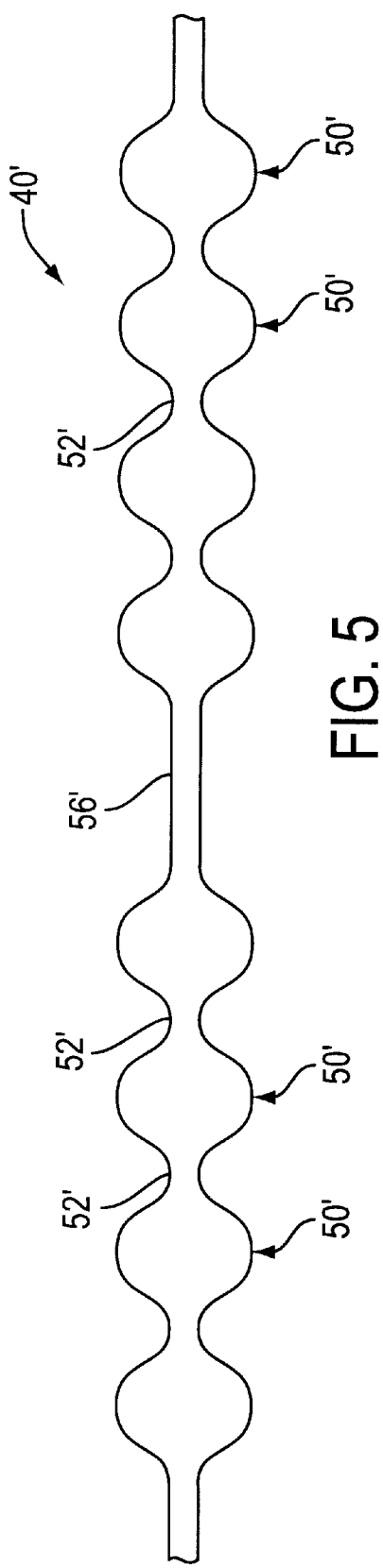
FIG. 5 is a side elevational view of an alternative embodiment of the container system of the present invention.
Figure 5A:
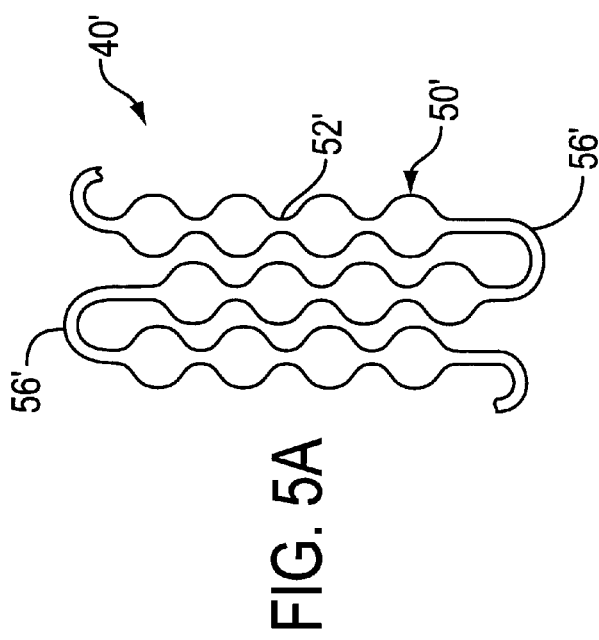
FIG. 5A is a partial view of the container system of FIG. 5 arranged in a sinuous configuration.

An alternate pressure vessel 40' is shown in FIGS. 5 and 5A. Pressure vessel 40' includes a plurality of hollow chambers 50' having a generally spherical shape connected by conduit sections 52' and 56'. As shown in FIG. 5A, one particular configuration of the pressure vessel 40' is to bend it back-and-forth upon itself in a sinuous fashion. The pressure vessel 40' is bent at the elongated conduit sections 56', which are elongated relative to the conduit sections 52' so that they can be bent without kinking or without adjacent hollow chambers 50' interfering with each other. Accordingly, the length of the conduit sections 56' can be defined so as to permit the pressure vessel to be bent thereat without kinking and without adjacent hollow chambers 50' interfering with each other. In general, a connecting conduit section 56' of sufficient length can be provided by omitting a chamber 50' in the interconnected series of chambers 50'. The length of a long conduit section 56', however, need not necessarily be as long as the length of a single chamber 50'.

Both ellipsoidal and the spherical chambers are preferred, because such shapes are better suited than other shapes, such as cylinders, to withstand high internal pressures. Spherical chambers 50' are not, however, as preferable as the generally ellipsoidal chambers 50 of FIGS. 3 and 4, because, the more rounded a surface is, the more difficult it is to apply a consistent winding of reinforcing filament fiber. Filament fibers, being applied with axial tension, are more prone to slipping on highly rounded, convex surfaces.

A portable pressure pack 60 employing a pressure vessel 40 as described above is shown in FIG. 6. Note that the pressure pack 60 includes a pressure vessel 40 having generally ellipsoidal hollow chambers 50. It should be understood, however, that a pressure vessel 40 of a type having generally spherical hollow chambers as shown in FIGS. 5 and 5A could be employed in the pressure pack 60 as well. The pressure vessel 40 is arranged as a continuous, serial strand 58 of interconnected chambers 50 bent back-and-forth upon itself in a sinuous fashion with all of the chambers lying generally in a common plane. In general, the axial arrangement of any strand of interconnected chambers can be an orientation in any angle in X-Y-Z Cartesian space. Note again, in FIG. 6, that elongated conduit sections 56 are provided. Sections 56 are substantially longer than conduit sections 52 and are provided to permit the pressure vessel 40 to be bent back upon itself without kinking the conduit section 56 or without adjacent chambers 50 interfering with one another. Again, an interconnecting conduit 56 of sufficient length for bending can be provided by omitting a chamber 50 from the strand 58 of interconnected chambers.

The pressure vessel 40 is encased in a protective housing 62. Housing 62 may have a handle, such as an opening 64, provided therein.

A fluid transfer control system 76 is pneumatically connected to the pressure vessel 40 and is operable to control transfer of fluid under pressure into or out of the pressure vessel 40. In the embodiment illustrated in FIG. 6, the fluid transfer control system includes a one-way inlet valve 70 (also known as a fill valve) pneumatically connected (e.g., by a crimp or swage) to a first end 72 of the strand 58 and a one-way outlet valve/regulator 66 pneumatically connected (e.g., by a crimp or swage) to a second end 74 of the pressure vessel 40. The inlet valve 70 includes a mechanism permitting fluid to be transferred from a pressurized fluid fill source into the pressure vessel 40 through inlet valve 70 and to prevent fluid within the pressure vessel 40 from escaping through the inlet valve 70. The outlet valve/regulator 66 includes a well known mechanism permitting the outlet valve/regulator to be selectively configured to either prevent fluid within the pressure vessel 40 from escaping the vessel through the valve 66 or to permit fluid within the pressure vessel 40 to escape the vessel in a controlled manner through the valve 66. Preferably, the outlet valve/regulator 66 is operable to "step down" the pressure of fluid exiting the pressure vessel 40. For example, in typical medicinal applications of ambulatory oxygen, oxygen may be stored within the tank at up to 3,000 psi, and a regulator is provided to step down the outlet pressure to 20 to 50 psi. The outlet valve/regulator 66 may include a manually-operable control knob 68 for permitting manual control of a flow rate therefrom.

A pressure relief valve (not shown) is preferably provided to accommodate internal pressure fluctuations due to thermal cycling or other causes.

Figure 6:
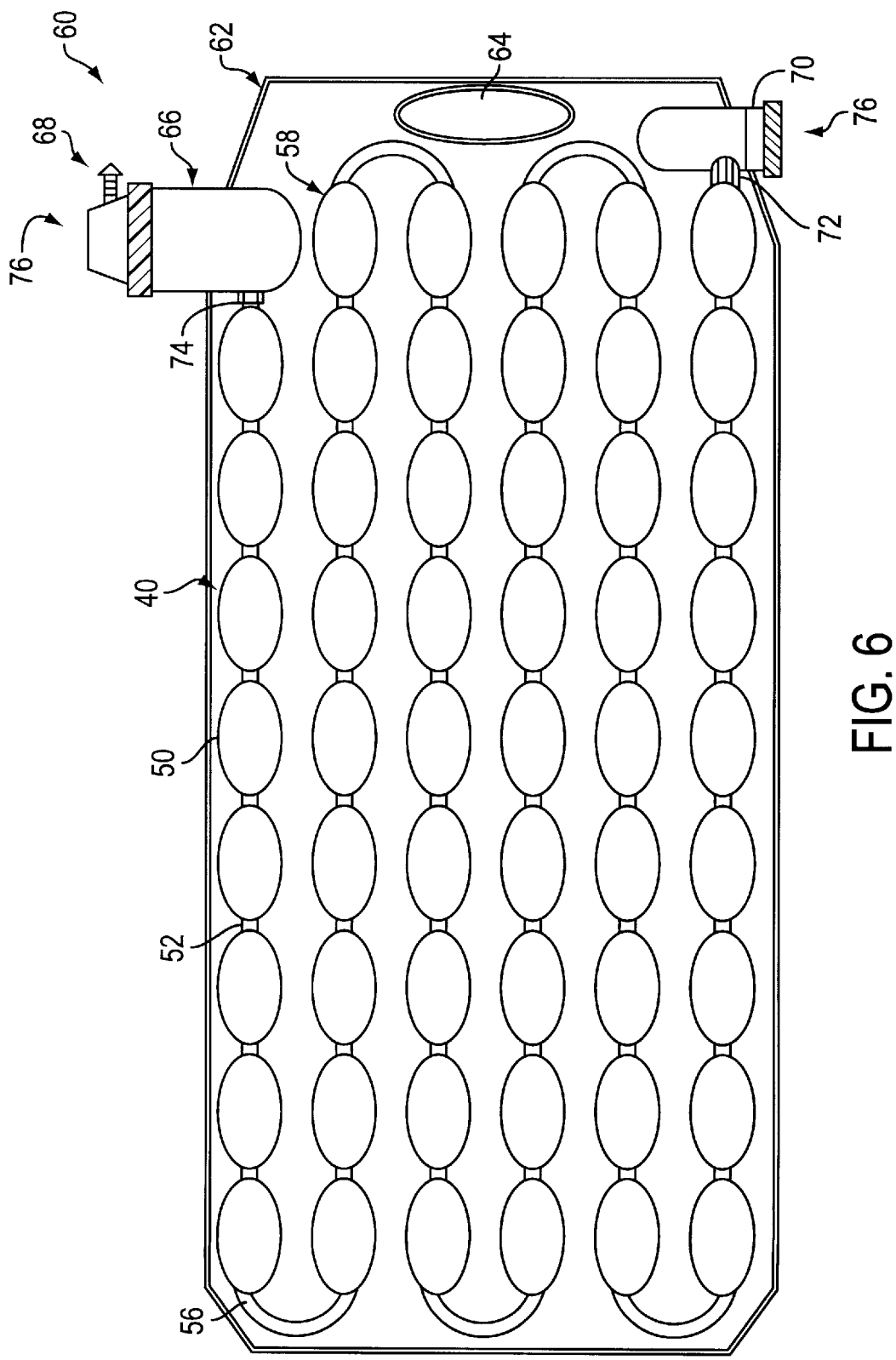
FIG. 6 is a portable pressurized fluid pack employing a container system according to the present invention.

In FIG. 6, the pressure vessel 40, inlet valve 70, and the outlet valve/regulator 66 are shown exposed on top of the housing 62. Preferably, the housing comprises dual halves of, for example, preformed foam shells that enclose the pressure vessel 40. For the purposes of illustrating the structure of the embodiment of FIG. 6, however, a top half of the housing 62 is not shown. It should be understood, however, that a housing would substantially encase the pressure vessel 40 and at least portions of the outlet valve/regulator 66 and the inlet valve 70.

Figure 7:
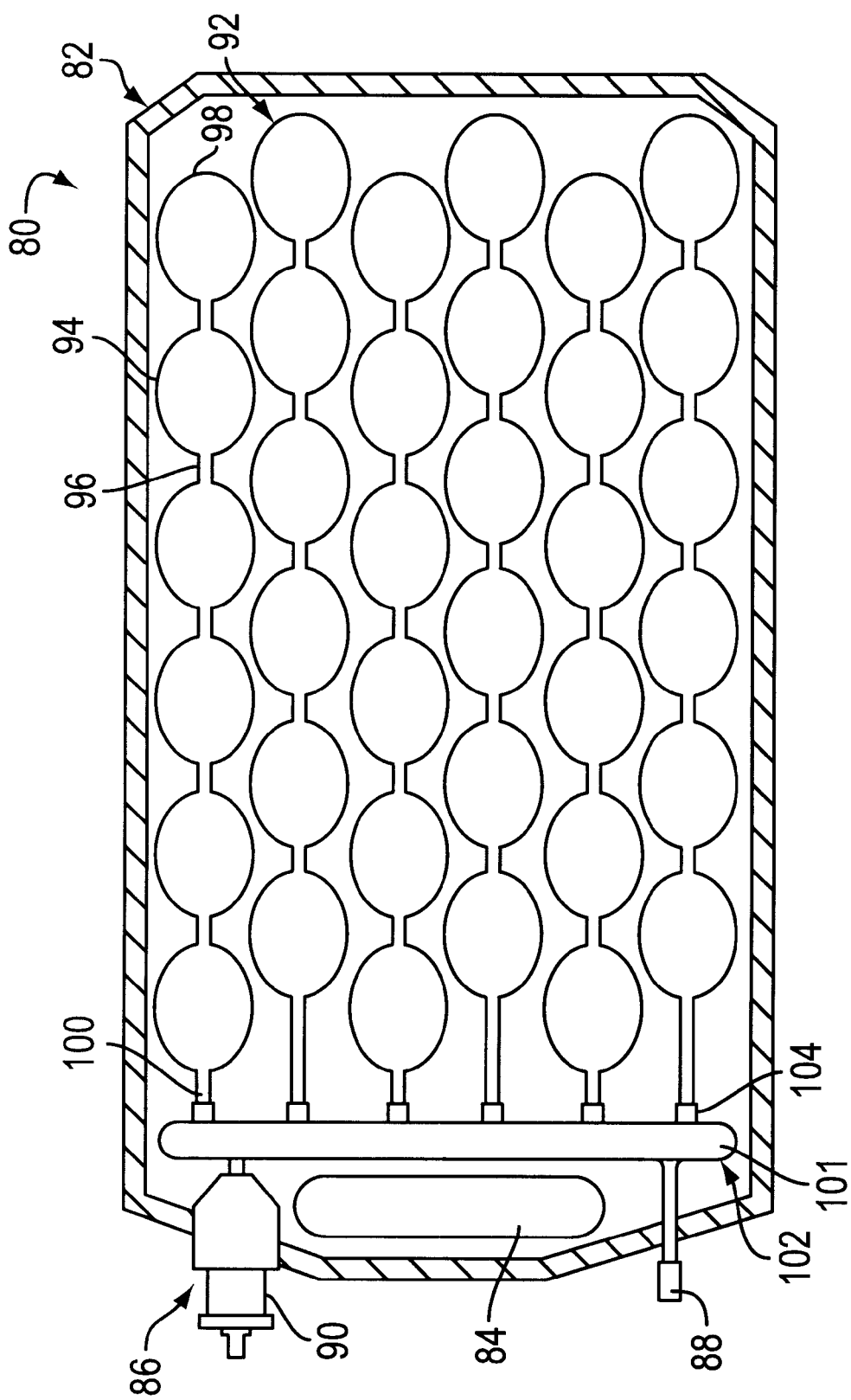
FIG. 7 is an alternate embodiment of a pressurized fluid pack employing the container system of the present invention.

FIG. 7 shows an alternate embodiment of a portable pressure pack generally designated by reference number 80. The pressure pack 80 includes a pressure vessel formed by a number of strands 92 of individual chambers 94 serially interconnected by interconnecting conduit sections 96 and arrange generally in parallel to each other. In the embodiment illustrated in FIG. 7, the pressure vessel includes six individual strands 92, but the pressure pack may include fewer than or more than six strands.

Each of the strands 92 has a first closed end 98 at the endmost of the chambers 94 of the strand 92 and an open terminal end 100 attached to a coupling structure defining an inner plenum, which, in the illustrated embodiment, comprises a distributor 102. The distributor 102 includes an elongated, generally hollow body 101 defining the inner plenum therein. Each of the strands 92 of interconnected chambers is pneumatically connected at its respective terminal end 100 by a connecting nipple 104 extending from the elongated body 101, so that each strand 92 of interconnected chambers 94 is in pneumatic communication with the inner plenum inside the distributor 102. Each strand 92 may be connected to the distributor 102 by a threaded interconnection, a crimp, or a swage, or any other suitable means for connecting a high pressure polymeric tube to a rigid fitting. A fluid transfer control system 86 is pneumatically connected to the distributor 102. In the illustrated embodiment, the fluid transfer control system 86 includes a one-way inlet valve 86 and a one-way outlet/regulator 90 pneumatically connected at generally opposite ends of the body 101 of the distributor 102.

The strands 92 of interconnected chambers 94, the distributor 102, and at least portions of the inlet valve 88 and the outlet valve/regulator 90 are encased within a housing 82, which may include a handle 84, as illustrated in FIG. 7, to facilitate carrying of the pressure pack 80.

Figure 8:
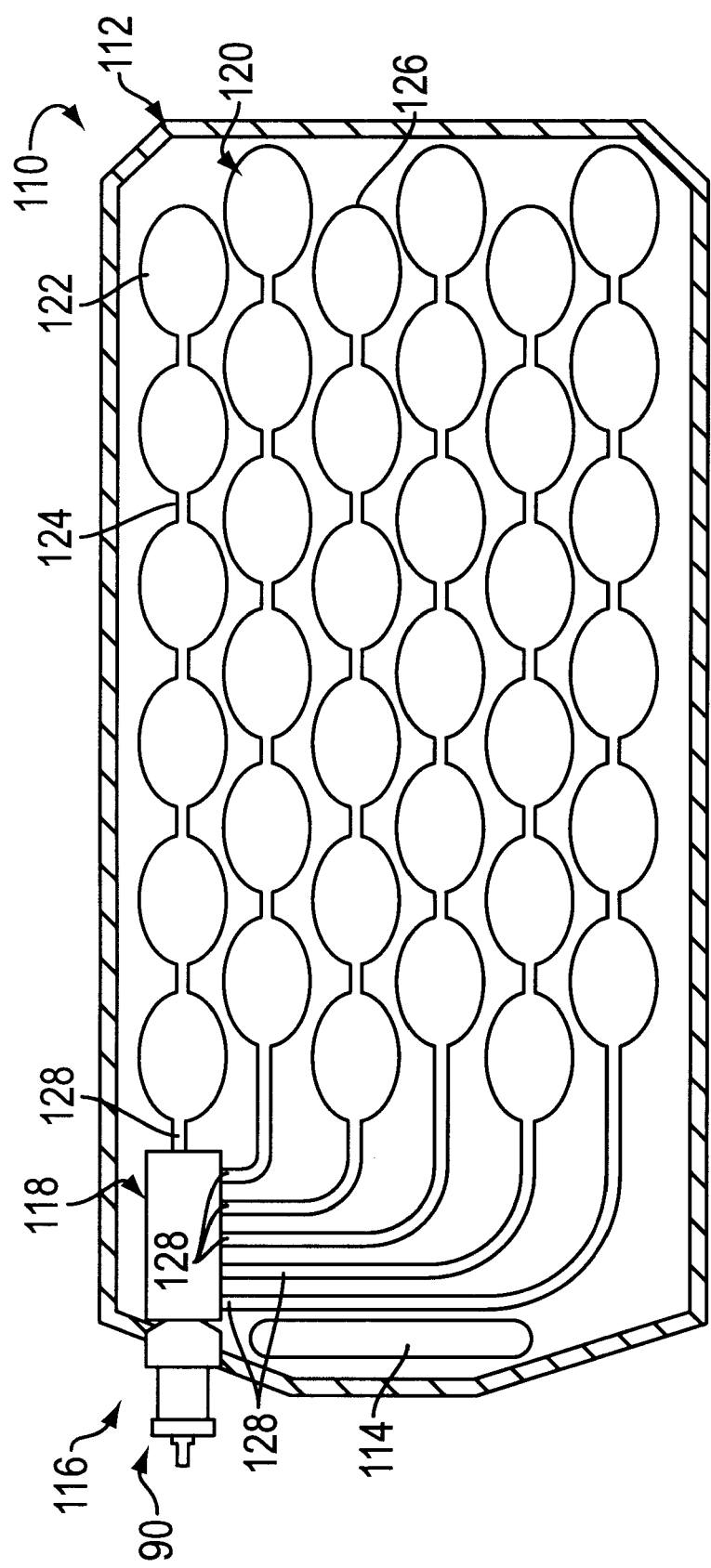
FIG. 8 is still another alternate embodiment of a pressurized fluid pack employing a container system according to the present invention.

In FIG. 8 is shown still another alternative embodiment of a pressure pack generally designated by reference number 110. The pressure pack 110 includes a pressure vessel comprised of a number of generally parallel strands 120 of hollow chambers 122 serially interconnected by interconnecting conduit sections 124. Each of the strands 120 has a closed end 126 at the endmost of its chambers 122 and an open terminal end 128 attached to a coupling structure defining an inner plenum. In the illustrated embodiment, the coupling structure comprises a manifold 118 to which is pneumatically attached each of the respective terminal ends 128 of the strands 120. Each strand 120 may be connected to the manifold 118 by a threaded interconnection, a crimp, or a swage, or any other suitable means for connecting a high pressure polymeric tube to a rigid fitting. A fluid transfer control system 116 is attached to the manifold 118, and, in the illustrated embodiment, comprises a outlet valve/regulator 90 and an inlet valve (not shown).

The hollow chambers of the pressure vessels described above and shown in FIGS. 5A, 6, 7, and 8 can be of the type shown in FIGS. 2 and 2A having an internal perforated tubular core, or they can be of the type shown in FIG. 4 having no internal tubular core.

Figure 9:
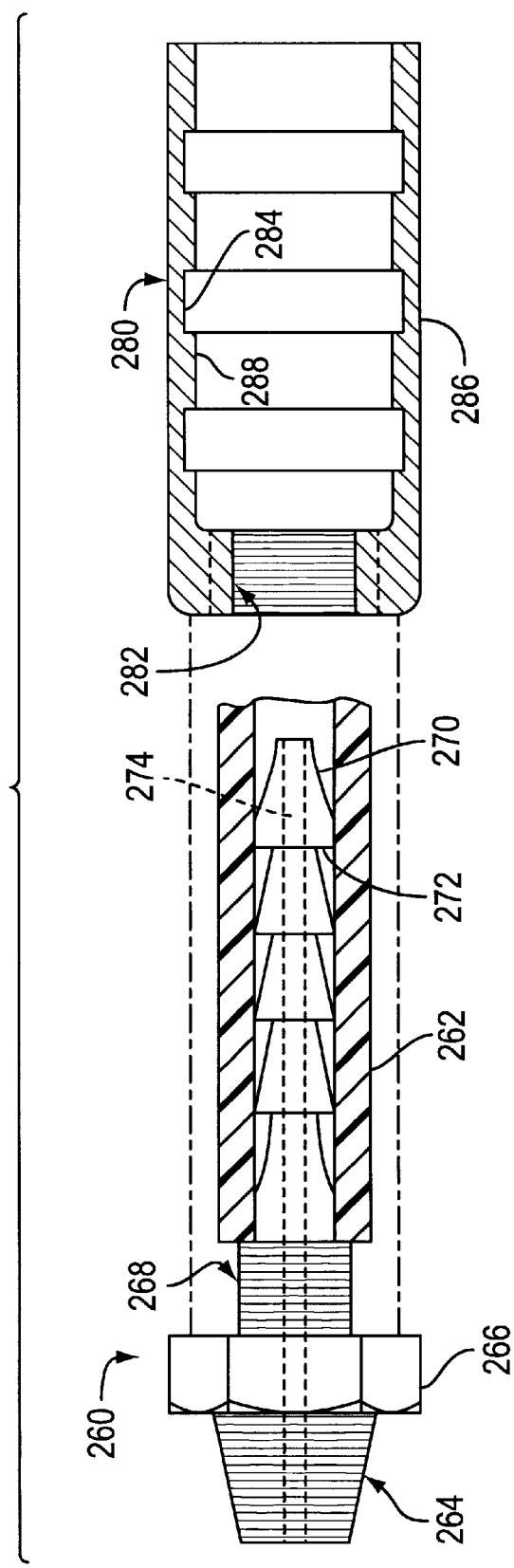
FIG. 9 is a partial, exploded view in longitudinal section of a system for securing a polymeric tube to a mechanical fitting.

FIG. 9 shows a preferred arrangement for attaching a mechanical fitting 260 to a polymeric tube 262 in a manner that can withstand high pressures within the tube 262. Such fittings 260 can be attached to the ends of a continuous strand of serially connected hollow chambers for connecting inlet and outlet valves at the opposite ends. For example, fittings 34 and 36 shown in FIG. 1 could be attached in the manner to be described. The mechanical fitting 260 has a body portion, which, in the illustrated embodiment includes a threaded end 264 to which can be attached another component, such as a valve or a gauge, and a faceted portion 266 that can be engaged by a tool such as a wrench. The body portion is preferably made of brass. End 264 is shown as an exteriorly threaded male connector portion, but could be an interiorly threaded female connector portion. An exteriorly threaded collar 268 extends to the right of the faceted portion 266. An inserting projection 270 extends from the threaded collar 268 and has formed thereon a series of barbs 272 of the "Christmas tree" or corrugated type that, due to the angle of each of the barbs 272, permits the projection 270 to be inserted into the polymeric tube 262, as shown, but resists removal of the projection 270 from the polymeric tube 262. A channel 274 extends through the entire mechanical fitting 260 to permit fluid transfer communication through the fitting 260 into a pressure vessel.

A connecting ferrule 280 has a generally hollow, cylindrical shape and has an interiorly threaded opening 282 formed at one end thereof. The remainder of the ferrule extending to the right of the threaded opening 282 is a crimping portion 286. The ferrule 280 is preferably made of 6061 T6 aluminum. The crimping portion 286 has internally-formed ridges 288 and grooves 284. The inside diameter of the ridges 288 in an uncrimped ferrule 280 is preferably greater than the outside diameter of the polymeric tube 262 to permit the uncrimped ferrule 280 to be installed over the tube 262.

Attachment of the fitting 260 to the tube 262 is affected by first screwing the threaded collar 268 into the threaded opening 282 of the ferrule 280. Alternatively, the ferrule 280 can be connected to the fitting 260 by other means. For example, the ferrule 280 may be secured to the fitting 260 by a twist and lock arrangement or by welding (or soldering or brazing) the ferrule 280 to the fitting 260. The polymeric tube 262 is then inserted over the inserting projection 270 and into a space between the crimping portion 286 and the inserting projection 270. The crimping portion 286 is then crimped, or swaged, radially inwardly, i.e., swaged, in a known manner to thereby urge the barbs 272 and the ridges 288 and grooves 284 into locking deforming engagement with the tube 262.

Accordingly, the ferrule 280 functions as a dual locking swaging mechanism as the tube 262 is securely held to the fitting 260 by both the frictional engagement of the tube 262 with the barbs 272 of the inserting projection 270 as well as the frictional engagement of the tube 262 with the grooves 284 and ridges 288 of the ferrule 280, which itself is secured to the fitting 260, e.g., by threaded engagement of the threaded collar 268 with the threaded opening 282. Moreover, because the ferrule and the body portion of the fitting are formed separately and only connected to one another when installed on a polymeric tube, the fitting and ferrule can be made relatively inexpensively.

Although, in the preferred embodiment, the ferrule 280 is threadedly connected to the body portion of the fitting, as described above, the beneficial aspects of the invention will be realized by forming the body portion of the fitting and the ferrule separately and thereafter connecting them to one another in any known manner during installation onto a polymeric tube. For example, if the body portion and ferrule are each made of suitable materials, they can be welded or adhesively bonded together.

A connecting arrangement of the type shown in FIG. 9 could also be used, for example, for attaching the strands 92 of interconnected chambers to the connecting nipples 104 of the distributor 102 in FIG. 7 or to attach the strands of interconnected chambers 120 to the connecting nipples 138 and 140 of the manifold 118 of FIG. 8.

While the mechanical fitting 260 has been described in the context of its application onto a pressure vessel formed from a plurality of interconnected ellipsoidal or spherical polymeric chambers, it should be appreciated that the fitting may be applied in any context in which a mechanical fitting is attached to an end of an elastomeric tube. The dual locking swaging mechanism provided by the ferrule permits the fitting to withstand high internal pressures within the tube. For example, the dual locking swaging mechanism could be employed on the ends of gas hoses connected to conventional cannister pressure vessels, or they could be employed on air hoses used for connecting pneumatically-driven equipment to a source of compressed air.

While the invention has been described in connection with what are presently considered to be the most practical and preferred embodiments, it is to be understood that the invention is not to be limited to the disclosed embodiments, but, on the contrary, it is intended to cover various modifications and equivalent arrangements included within the spirit and scope of the appended claims. Thus, it is to be understood that variations in the particular parameters used in defining the present invention can be made without departing from the novel aspects of this invention as defined in the following claims.

What is claimed is:

1. A container system for pressurized fluids comprising:

a pressure vessel including a (1) plurality of hollow polymeric chambers having a generally ellipsoidal shape and which are interconnected by polymeric conduit sections positioned between adjacent ones of said plurality of hollow chambers with an end one of said conduit sections extending from an endmost one of said interconnected hollow chambers, each of said conduit sections having a maximum interior transverse dimension that is smaller than a maximum interior transverse dimension of each of said hollow chambers, and (2) a housing encasing said chambers and conduit sections and holding said chambers and conduit sections in fixed positions relative to one another;

a mechanical fitting connected to said end one of said plurality of conduit sections, said mechanical fitting comprising a body portion with a projection extending therefrom and adapted to be axially inserted into said conduit section; and a ferrule for securing said conduit section onto said projection, said ferrule being connected at one longitudinal end thereof to said body portion and arranged in an outwardly spaced coaxial relation with respect to said projection, said ferrule having a crimping portion constructed and arranged to be radially swaged onto a portion of said conduit section into which said projection is inserted to thereby compress the portion of said conduit section onto said projection to secure the conduit section onto said projection.

* * * * *